United States Patent [19]
Jellema et al.

[11] Patent Number: 6,041,115
[45] Date of Patent: Mar. 21, 2000

[54] USER INTERACTION PROCEDURE

[75] Inventors: Bart Jellema, Rijen; René Peeren; Louise Croughan, both of Osterhart; Freek Aben, Rykevoort, all of Netherlands

[73] Assignee: Telefonaktiebolaget LM Ericsson, Stockholm, Sweden

[21] Appl. No.: 08/895,836

[22] Filed: Jul. 17, 1997

[30] Foreign Application Priority Data

Jul. 19, 1996 [GB] United Kingdom ............... 9615151

[51] Int. Cl.[7] ............. H04M 7/00; H04M 1/64; H04M 11/00; H04M 3/42
[52] U.S. Cl. ............... 379/230; 379/88.16; 379/92.04; 379/207
[58] Field of Search .................... 379/220, 88.16, 379/92.01, 92.02, 92.03, 92.04, 207, 219, 230

[56] References Cited

U.S. PATENT DOCUMENTS

| | | | |
|---|---|---|---|
| 5,418,844 | 5/1995 | Morrisey et al. | 379/207 |
| 5,436,957 | 7/1995 | McConnell | 379/88.23 |
| 5,535,263 | 7/1996 | Blumhardt | 379/88.21 |
| 5,815,561 | 9/1998 | Nguyen et al. | 379/115 |
| 5,838,774 | 11/1998 | Weisser, Jr. | 379/92.02 |
| 5,850,435 | 12/1998 | Devillier | 379/374 |

FOREIGN PATENT DOCUMENTS

WO85/02510  6/1985  WIPO ................... 379/201

OTHER PUBLICATIONS

PCT International Search Report, Feb. 12, 1998.
PCT Written Opinion, Apr. 16, 1998.
M. Chopra, "Exploring Intelligent Peripheral Configurations", International Conference on Universal Personal Communications, Sep. 27, 1994, pp. 635–639.
Tetsuro Shimogaki et al., Development of Intelligent Network System, NEC Research and Development, vol. 34, No. 1, Jan. 1, 1993, pp. 109–121.
Dave Gerads, AIN O.2 Extensions In A Testbed Environment, Institute of Electrical And Electronics Engineers, pp. 97–101.
M.C. Bale, "Signalling in the intelligent network", BT Technology Journal, vol. 13, No. 2.
Vincent Bic, "Voice Peripherals in the Intelligent Network", vol. 28, No. 6, Jun. 1994, p. 29/30, 32, 34.
ETSI, Intelligent Network (IN); Intelligent Network Capability Set 1 (CS1) Core Intelligent Network Application Protocol (INAP) Part 1. Protocol specification, ETS 300 374–1, Sep. 1994.

*Primary Examiner*—Harry S. Hong
*Attorney, Agent, or Firm*—Burns, Doane, Swecker & Mathis, L.L.P.

[57] ABSTRACT

A user interaction procedure in an Intelligent Networks system may include several stages, such as playing an announcement to a user, and receiving digits entered by the user. The switching point returns messages to the control point at intermediate stages during the procedure.

9 Claims, 2 Drawing Sheets

USER INTERACTION PROCEDURE

FIELD OF THE INVENTION

This invention relates to a user interaction procedure, specifically in an Intelligent Networks telecommunications network architecture.

BACKGROUND OF THE INVENTION

The Intelligent Networks (IN) architecture consists of a Service Switching Point (SSP), which is a switching system that is able to intercept telephone calls, and query a Service Control Point (SCP). The SCP is a system which contains service specific logic, and data which allows it to return instructions to the SSP on how further to treat the intercepted call.

Many IN services include a user interaction phase, which typically consists of an announcement being played to the user, and may then require the user to send digits back to the SSP, in order to indicate the requested service.

From existing IN standards, for example European Telecommunication Standard ETS 300 374-1 (pages 163–165) a system is known in which, when the SCP sends an instruction to the SSP to play an announcement to the end user, an instruction may also be sent to the SSP that, at the end of the user interaction procedure, a report should be sent back from the SSP to the SCP. Similarly, from the same document at pages 166–171, when the user interaction procedure involves the user returning digits to the SSP, the SCP can send an instruction to the SSP, instructing the SSP to report at the end of the user interaction procedure, i.e. at the end of digit collection.

However, these prior art systems have the limitation that the service logic is unable to make decisions based on intermediate events occurring during the interaction procedure.

SUMMARY OF THE INVENTION

The present invention seeks to overcome this limitation in the prior art, by allowing intermediate reports to be sent from the SSP to the SCP. This has the advantage that the SCP is then able, in appropriate circumstances, to take account of the latest status of the user interaction procedure in making further decisions.

BRIEF DESCRIPTION OF THE DRAWINGS

Reference will now be made, by way of example, to the accompanying drawings, in which.

DETAILED DESCRIPTION OF THE INVENTION

Figure 1:
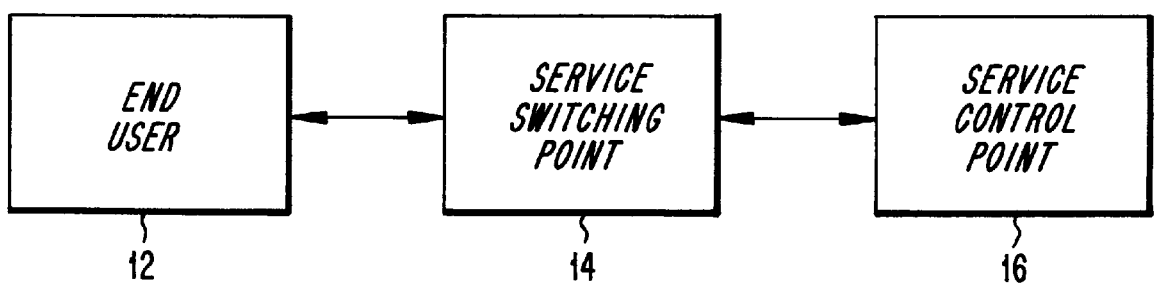
FIG. 1 is a schematic illustration of an Intelligent Networks architecture.

FIG. 1 shows an architecture with an end user 12, such as a telephone subscriber, being connected to a Service Switching Point (SSP) 14. The SSP 14 is in turn connected to a Service Control Point (SCP) 16. It will be appreciated that FIG. 1 shows only a small part of a network, which may include many end users, SSPs, and SCPs. The SSP intercepts telephone calls and queries the SCP, which contains service specific logic and data, which allows it to return instructions to the SSP on how to deal with an intercepted call.

Figure 2:
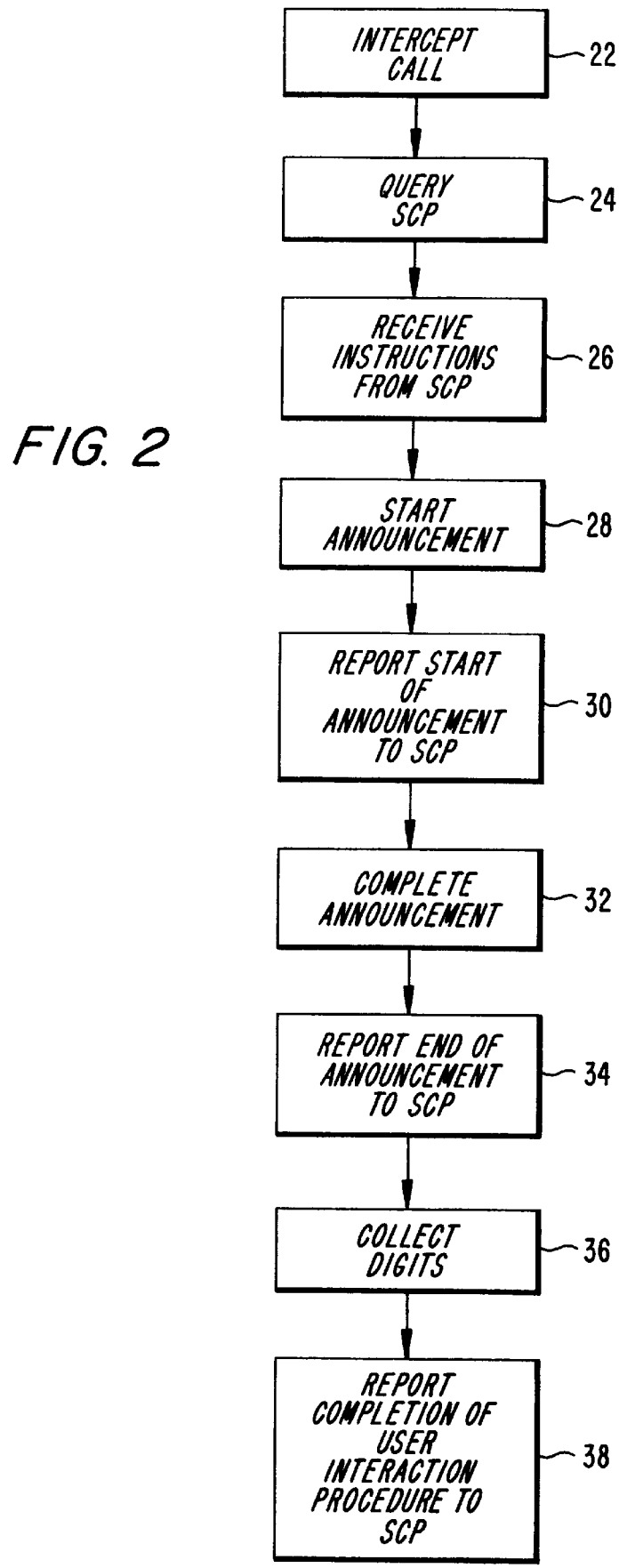
FIG. 2 is a flow chart illustrating a user interaction procedure operating in accordance with the present invention.

FIG. 2 is a flow chart illustrating a user interaction procedure in accordance with the invention.

In step 22 of the procedure, the SSP intercepts a call originating from an end user. In step 24, the SSP queries the SCP, for instructions on how to treat the call. In step 26, the SSP receives instructions from the SCP. These instructions will typically include instructions to play an announcement to the user, and, in this illustrated example, include instructions to collect digits from the user in response to the announcement. Moreover, in this case, the instructions from the SCP to the SSP also include instructions to report intermediate events in the user interaction procedure.

Thus, in step 28, the SSP starts the announcement to the end user. In step 30, the SSP reports to the SCP about the successful start of the announcement. In step 32, the SSP completes the announcement to the user. Then, in step 34, the SSP reports to the SCP about the end of the announcement. In step 36, the SSP collects the digits entered by the user. Finally, in step 38, the SSP reports to the SCP that the user interaction procedure has been completed. By contrast with the prior art, in which such a report is the only report of its type sent by the SSP to the SCP, in this case the report sent by the SSP must indicate that it is the completion of the user interaction procedure which is being reported.

By comparison with the prior art system, the procedure described above includes two additional report stages, in which the SSP reports to the SCP about the start of the announcement and the end of the announcement. This information allows the SCP to make decisions based on those intermediate events. For example, the SCP might start charging when the successful start of the announcement is reported. In addition, the SCP is able properly to synchronize its instructions, for example by issuing instructions at an appropriate stage in the procedure or by allowing or denying other service requests depending on the status of the user.

It will be appreciated that the instructions sent by the SCP to the SSP, and received in step 26, must indicate to the SSP which intermediate reports are required. Thus, the message from the SCP will need to include appropriate indications, if intermediate reports are required.

There is thus described a procedure which allows the service logic to have a more accurate view of the user status, and the status of the system, so that it is able when necessary to act on accurate information.

What is claimed is:

1. A method of handling a user interaction procedure during a telephone call, in a network including a switching point and a control point, in which the user is connected to the switching point and the switching point is connected to the control point, the user interaction procedure including a plurality of stages during which messages are sent from the switching point to a user, and from the user to the switching point, but not from the control point to the switching point, the method comprising sending at least one report from the switching point to the control point during the user interaction procedure.

2. A method as claimed in claim 1, comprising sending a report from the switching point to the control point at the completion of each stage during the procedure.

3. A method as claimed in claim 1, comprising sending a report from the switching point to the control point at the start of a first stage during the procedure.

4. A method as claimed in claim 1, wherein the or each report sent from the switching point to the control point includes an indication as to the event being reported.

5. The method of claim 1, further comprising the sending of a report from the switching point to the control point at least after the start of each of said stages during the user interaction procedure.

6. The method of claim 1, wherein said at least one report is a successful start of an announcement by the SSP to the user.

7. The method of claim 1, wherein said at least one report is an end of an announcement by the SSP to the user.

8. A control point for a telecommunications network, comprising means for recognizing a query received from a switching point, and means for transmitting, prior to a user interaction period between said switching point and an user, instructions to the switching point to initiate a user interaction procedure with an user in response thereto, the user interaction procedure including a plurality of stages during which messages are sent from the switching point to a user, and from the user to the switching point, but not from the control point to the switching point, wherein the means for transmitting instruction includes means for selectively transmitting instructions to the switching point to send reports to the control point during the user interaction period.

9. A method of handling a user interaction procedure during a telephone call, in a network including a switching point and a control point, the user interaction procedure including a plurality of stages during which messages are sent from the switching point to a user, and from the user to the switching point, but not from the control point to the switching point, the method comprising the step of sending a report from the switching point to the control point at least at the start of each stage during the procedure.

* * * * *